United States Patent [19]
Kenney

[11] Patent Number: 6,079,500
[45] Date of Patent: Jun. 27, 2000

[54] HORSE LEG AND HOOF CLEANING TOOL

[76] Inventor: Vaughn G. Kenney, R.R. #2, Grand Prairie, Alberta, Canada, T8V 2Z9

[21] Appl. No.: 09/192,105

[22] Filed: Nov. 13, 1998

[51] Int. Cl.⁷ .............................. A01L 15/00; A47L 13/02
[52] U.S. Cl. .................. 168/48.1; 15/236.01; 15/236.07; 15/236.08
[58] Field of Search .................... 168/48.1, 45; 446/112, 446/115, 119; 15/236.07, 236.09, 236.01, 237, 236.08, 240; 119/623, 600, 621, 708; 473/576, 575; D30/160

[56] References Cited

U.S. PATENT DOCUMENTS

| | | | |
|---|---|---|---|
| D. 298,871 | 12/1988 | Killen | D30/160 |
| 2,569,022 | 9/1951 | Sagers | 17/7 |
| 3,516,195 | 6/1970 | Batley | 46/63 |
| 3,751,753 | 8/1973 | Drewitz | 15/237 |
| 3,789,453 | 2/1974 | Curtis | 15/237 |
| 3,826,022 | 7/1974 | Grzech | 36/2.5 AL |
| 3,976,303 | 8/1976 | Lillibridge et al. | 280/11.37 E |
| 3,976,364 | 8/1976 | Lillibridge et al. | 280/11.37 E |
| 3,999,773 | 12/1976 | Shuttleworth | 280/11.37 E |
| 4,000,909 | 1/1977 | Coale | 280/11.37 E |
| 4,023,291 | 5/1977 | Mc Millian | 40/125 H |
| 4,145,062 | 3/1979 | Stiement | 280/11.37 E |
| 4,145,663 | 3/1979 | Knapp et al. | 280/11.37 E |
| 4,221,393 | 9/1980 | Donahue | 280/813 |
| 4,367,798 | 1/1983 | Sabol | 168/45 |
| 4,425,677 | 1/1984 | Cox | 15/104.92 |
| 4,571,767 | 2/1986 | Dangler | 15/161 |
| 4,670,932 | 6/1987 | Williams | 15/237 |
| 4,696,346 | 9/1987 | Ryan | 168/45 |
| 4,784,391 | 11/1988 | Herron | 273/109 |
| 4,785,490 | 11/1988 | Thomas | 15/237 |
| 4,813,685 | 3/1989 | Gaston | 273/414 |
| 4,878,868 | 11/1989 | Shaw | 446/75 |
| 5,007,483 | 4/1991 | McGuire | 168/48.1 |
| 5,042,839 | 8/1991 | Ciari | 280/813 |
| 5,147,098 | 9/1992 | McCrink | 280/813 |
| 5,168,935 | 12/1992 | Thornburg et al. | 168/48.1 |
| 5,176,222 | 1/1993 | Tippin | 168/48.1 |
| 5,509,167 | 4/1996 | Wilson | 15/237 |
| 5,575,337 | 11/1996 | Sapyta | 168/48.1 |
| 5,636,696 | 6/1997 | Ryling | 168/45 |
| 5,636,697 | 6/1997 | Pitchford | 168/48.1 |
| 5,685,375 | 11/1997 | Schock | 168/48.2 |
| 5,694,660 | 12/1997 | Rachwalski | 15/237 |
| 5,713,697 | 2/1998 | Brown | 15/237 |
| 5,924,908 | 7/1999 | O'Heir | 446/168 |

*Primary Examiner*—Michael J. Carone
*Assistant Examiner*—Son T. Nguyen
*Attorney, Agent, or Firm*—David S. Thompson

[57] ABSTRACT

A horse leg and hoof cleaning tool 10 provides identical first and second scrapers 20 each attached to opposed ends of a cord 60. Individually, either scraper may be used to clean portions of a horse's leg or hoof. When one scraper is held in each hand and the cord stretched between them, the cord will adjustably conform to the contour of a horse's leg or hoof and may be used to wipe away mud and debris.

3 Claims, 2 Drawing Sheets

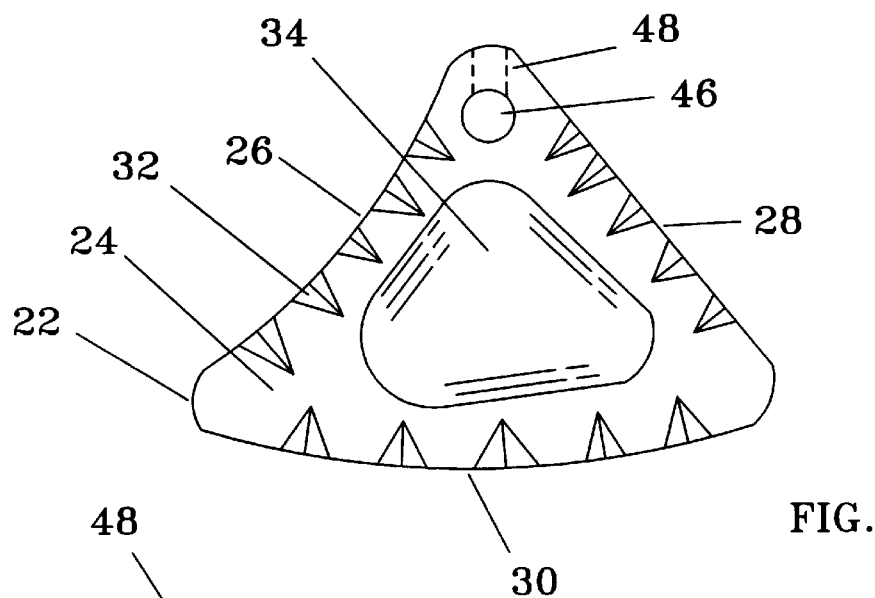
FIG. 1
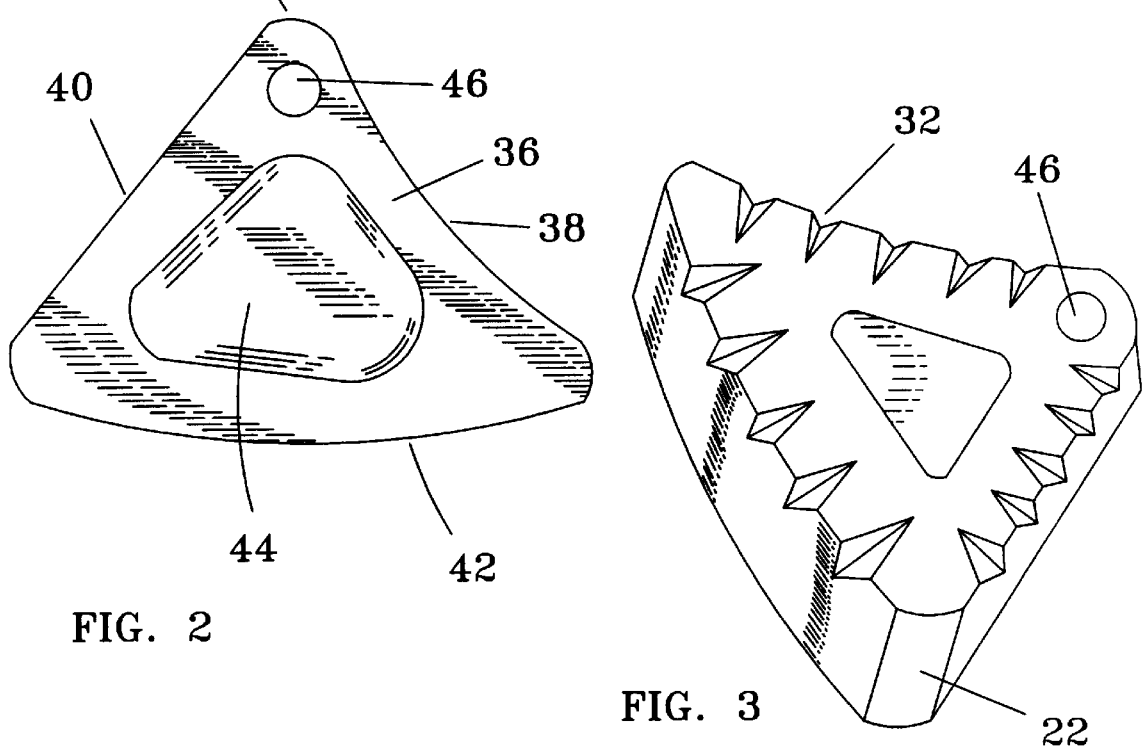
FIG. 2
FIG. 3

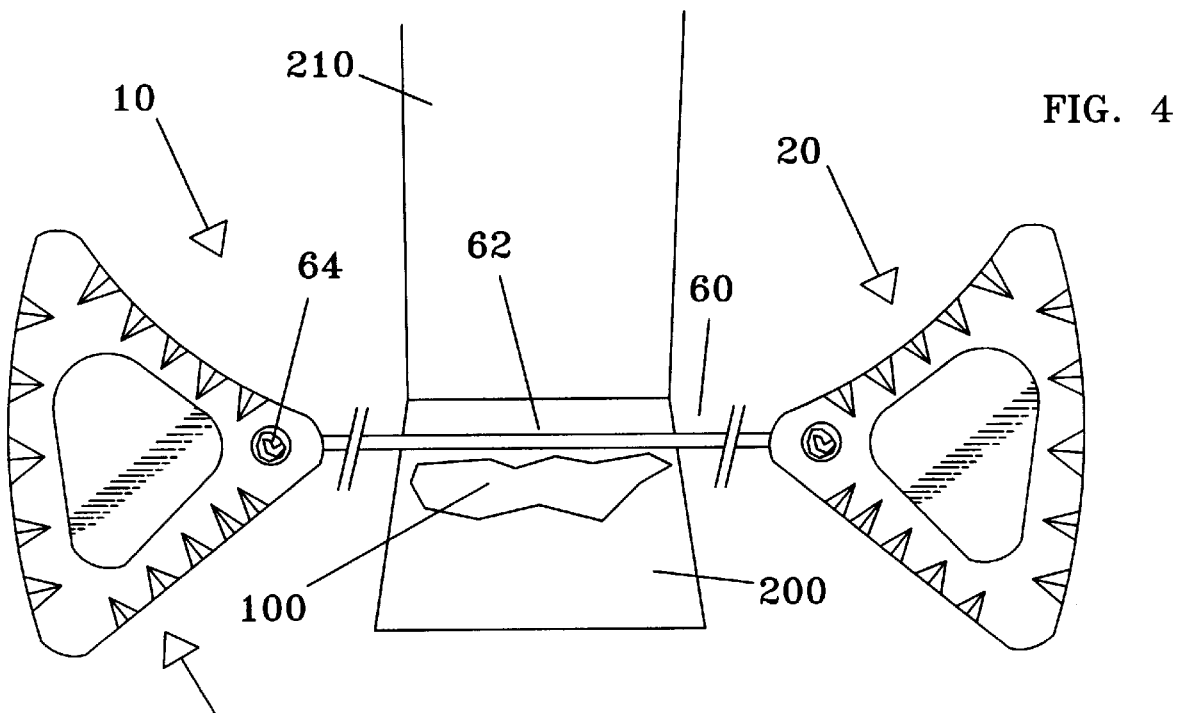
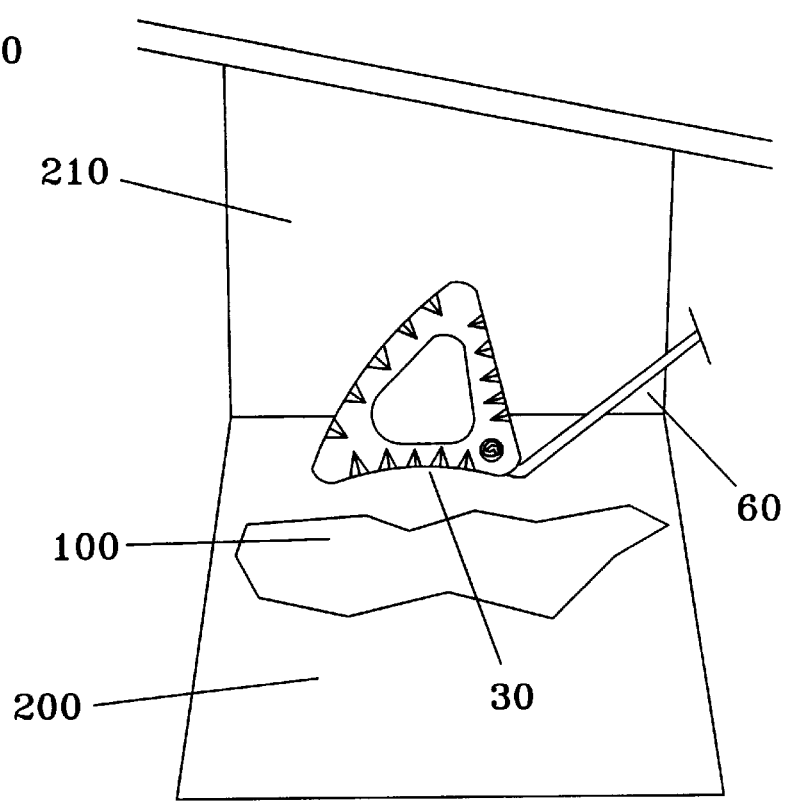

HORSE LEG AND HOOF CLEANING TOOL

CROSS-REFERENCES

There are no applications related to this application filed in this or any foreign country.

BACKGROUND

The problem of how to tend to a horse's hoof has been previously addressed, and a number of tools have been developed. U.S. Pat. No. 5,685,375, issued Nov. 11, 1997 to Donald E. Schock, discloses a farrier's tool having a brush and a rotary blade for cleaning the crease in a horse shoe. U.S. Pat. No. 5,636,697, issued Jun. 10, 1997 to Nancy Pitchford, discloses a tool having an elongated flattened handle carrying a pick at one end and a hook at the other end. U.S. Pat. No. 5,575,337, issued Nov. 19, 1996 to Rachel T. Sapyta, discloses a tool having two picks supported by a handle. U.S. Pat. No. 5,176,222, issued Jan. 5, 1993 to Seven R. Tippin, discloses a hoof tool having a folding pick in a configuration resembling a folding knife. U.S. Pat. No. 5,168,935, issued Dec. 8, 1992 to Thornbury et al., discloses a horse hoof pick including an applicator for liquid dressing. U.S. Pat. No. 5,007,483, issued Apr. 16, 1991 to Douglas K. McGuire, discloses a hoof-buffing kit for farriers. U.S. Pat. No. 4,696,346, issued Sep. 29, 1987 to Michael K. Ryan, discloses a farrier's tool having a plier-like design. U.S. Pat. No. 4,367,798, issued Jan. 11, 1983 to Linda M. Sabol, discloses a horse hoof cleaning tool having a two-headed pick at a first end and a brush at a second end.

In spite of these advances, there is still no tool that is satisfactory for cleaning mud, dirt and debris from a horse hoof and lower leg. Existing tools are frequently specialized to clean the underside of a hoof, the space between hoof and shoe or the outside surface of the hoof. Known tools are not adapted to clean both the hoof and the lower leg of the horse. Known tools do not provide a variety of surfaces adapted to fit the variety of contours found on a horse's hoof and lower leg. Also, known tools do not provide a structure that does not bog-down or overload when a large amount of mud is to be removed rapidly.

SUMMARY

The present invention is directed to an apparatus that satisfies the above needs. A novel horse leg and hoof cleaning tool is disclosed that is adapted to cleaning both a horse's lower leg and hoof, which is suited for wiping off a coating of wet mud or scraping off a layer of dried mud and dirt. The tool provides a variety of concave, convex, linear and adjustable surfaces to adapt to clean any desired area.

The horse leg and hoof cleaning tool of the present invention provides some or all of the following structures:

(A) first and second scrapers, each scraper having a generally planar body having a substantially triangular shape with three rounded corners, wherein each scraper may more specifically provide:
 (a) a first surface, having a centrally located recessed area, the first surface bounded by three serrated edges, including:
  (i) a concave edge;
  (ii) a straight edge; and
  (iii) a convex edge;
 (b) a second surface, having a centrally located recessed area, the second surface bounded by three smooth edges, including:
  (i) a concave edge;
  (ii) a straight edge; and
  (iii) a convex edge;
 (c) a through hole, defining an opening between the first and second surfaces; and
 (d) an end hole, defining an opening into a first of the three rounded corners in communication with the through hole; and
(B) a connecting cord, having a first end attached to end hole of the first scraper and a second end attached to the end hole of the second scraper.

It is therefore a primary advantage of the present invention to provide a novel horse leg and hoof cleaning tool that is adapted to cleaning both the hoof and leg of a horse.

Another advantage of the present invention is to provide a novel horse leg and hoof cleaning tool that provides two scrapers, each having concave, convex and straight cleaning edges which adapt to differently shaped areas of a horse's leg or hoof.

A still further advantage of the present invention is to provide a novel horse leg and hoof cleaning tool that provides a soft cord carried between the two scrapers that is adapted for use in cleaning a horse's leg and hoof.

DRAWINGS

These and other features, aspects, and advantages of the present invention will become better understood with regard to the following description, appended claims, and accompanying drawings where:

FIG. 1 is an isometric view of a first surface of one of the scrapers, showing the serrations present.

FIG. 2 is an isometric view of a second surface of the scraper of FIG. 1, showing the smooth edges having no serrations.

FIG. 3 is a perspective view of the first surface of the scraper of FIG. 1.

FIG. 4 is a view of a version of the horse leg and hoof cleaning tool, with the cord being used to clean mud off a horse's hoof.

FIG. 5 is a view of the concave edge of one of the scrapers being used to clean a horse's hoof.

DESCRIPTION

Referring in generally to FIGS. 1 though 5, a horse leg and hoof cleaning tool 10 constructed in accordance with the principles of the invention is seen. The tool provides identical first and second scrapers 20 each attached to opposed ends of a cord 60. Individually, either scraper may be used to clean portions of a horse's leg or hoof. When one scraper is held in each hand and the cord stretched between them, the cord will adjustably conform to the contour of a horse's leg 210 or hoof 200 and may be used to wipe away mud 100 and debris.

Each scraper 20 is substantially planar in construction, having first and second surfaces 24, 36. A preferred embodiment of the scraper is approximately 3/8 inches thick and is three-sided, having gently rounded corners 22 and sides having a length of approximately 2 inches.

As seen in FIG. 1, the first surface 24 is generally triangular, having rounded corners and three sides. A first side provides a concave edge 26, a second side provides a straight edge 28 and a third side provides a convex edge 30. All three edges provide serrations 32, which are an aid in breaking up debris attached to the horse's leg and hoof. A middle portion of the first surface includes a recessed surface 34, which aids in manually gripping the scraper, typically by preventing a user's thumb from slipping.

As seen in FIG. 2, the second surface 36 is also substantially triangular, having rounded corners and three sides. A concave edge 38, a straight edge 40 and a convex edge 42 are smooth, having no serrations. A recessed surface 44 in a middle portion of the second surface assists the user to grip more firmly, particularly where mud and water would otherwise make the grip difficult.

As seen in FIGS. 1–3, a through hole 46 is defined between the first and second surfaces. The diameter of the through hole should be somewhat greater than the diameter of the cord 60, to allow the end of the cord to be knotted. An end hole 48 defines a passage between a rounded corner and the through hole 46. The end hole is seen in dotted outline in FIG. 1, and should be somewhat smaller in diameter than the through hole, so that the knotted cord can not pass through the end hole.

The cord 60 is attached at a first end to the first scraper and at a second end to the second scraper. The ends of the cord are attached to each scraper by passing the end of the cord into the end hole 48 and out one opening of the through hole 46. The end of the cord is then knotted and the knot 64 pulled into the region defined by the through hole. The sized of the knot prevents the end of the cord from being withdrawn through the end hole.

The horse leg and hoof cleaning tool may be used in a variety of ways. As seen in FIG. 5, each scraper can be used individually to clean either the horse's leg of hoof. Depending on the contour of the portion of the leg or hoof being cleaned, the user selects the appropriate edge shape. That is, the user selects between the concave, straight and convex edges the cleaning edge that is most applicable for the job. The shapes of the three edges, concave, straight and convex can be used advantageously to clean parts of the horse's leg and hoof that have correspondingly curved shapes. The user may also select either to use the serrated edge or the non-serrated smooth edge. In general, the serrated edge is applicable to use where dirt or mud 100 has dried to form a hardened crust, while the non-serrated smooth edge is better suited for use in cleaning wet mud.

Where desired, the user may stretch the cord 60 between the two scrapers 20 and clean the horse's leg or hoof using a middle portion 62 of the cord, as seen in FIG. 4. The cord is soft and flexible, and adjustably contours itself to the portion of the horse's leg or hoof being cleaned. By using a gentle downward motion, the user may remove mud and dirt 100 from the horse.

In a preferred embodiment, the through hole 46 and end hole 48 are defined in the corner of the scraper adjacent to the straight and concave sides, as seen in FIG. 4. In this circumstance, when the user is using the cord, as seen in FIG. 4, the user may grasp an entire scraper in each hand, and rest a thumb on each concave surface. This is particularly advantageous where the user has smaller hands. Where the user's hands are larger, the user tends rest the thumbs of each hand on the recessed surfaces 34, 44.

The previously described versions of the present invention have many advantages, including a primary advantage of providing a novel horse leg and hoof cleaning tool that is adapted to cleaning both the hoof and leg of a horse.

Another advantage of the present invention is to provide a novel horse leg and hoof cleaning tool that provides two scrapers, each having concave, convex and straight cleaning edges which adapt to differently shaped areas of a horse's leg or hoof.

A still further advantage of the present invention is to provide a novel horse leg and hoof cleaning tool that provides a soft cord carried between the two scrapers that is adapted for use in cleaning a horse's leg and hoof.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while a three-side scraper is preferred, it is clear that a scraper having a different number of sides could be constructed in accordance with the teachings of the invention. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A horse leg and hoof cleaning tool comprising:
   (A) first and second scrapers, each scraper having a generally planar body which comprises:
      (a) a first surface, having a centrally located recessed area, the first surface bounded by three serrated edges; and
      (b) a second surface, having a centrally located recessed area, the second surface bounded by three smooth edges; and
   (B) a connecting cord, having a first end attached to the first scraper and a second end attached to the second scraper.

2. The horse leg and hoof cleaning tool of claim 1, in which the first and second surfaces comprise:
   (i) a concave edge;
   (ii) a straight edge; and
   (iii) a convex edge.

3. A horse leg and hoof cleaning tool comprising:
   (A) first and second scrapers, each scraper having a generally planar body having a substantially triangular shape with three rounded corners, wherein each scraper additionally comprises:
      (a) a first surface, having a centrally located recessed area, the first surface bounded by three serrated edges, comprising:
         (i) a concave edge;
         (ii) a straight edge, adjacent to the concave edge; and
         (iii) a convex edge, adjacent to the straight edge;
      (b) a second surface, having a centrally located recessed area, the second surface bounded by three smooth edges, comprising:
         (i) a concave edge;
         (ii) a straight edge, adjacent to the concave edge; and
         (iii) a convex edge, adjacent to the straight edge;
      (c) a through hole, defining an opening between the first and second surfaces; and
      (d) an end hole, defining an opening into a first of the three rounded corners in communication with the through hole; and
   (B) a connecting cord, having a first end attached to the end hole of the first scraper and a second end attached to the end hole of the second scraper.

* * * * *